US011919765B2

(12) United States Patent
Kieras et al.

(10) Patent No.: US 11,919,765 B2
(45) **Date of Patent: *Mar. 5, 2024**

(54) HIGH FLOW TAP FOR DISPENSING FLUIDS FROM A CONTAINER AND RELATED APPLICATIONS

(71) Applicant: LIQUI-BOX CORPORATION, Richmond, VA (US)

(72) Inventors: Ronald E. Kieras, Woodstock, IL (US); Loren L. Brelje, Glencoe, MN (US); Matthew Ruschmeier, Glencoe, MN (US)

(73) Assignee: LIQUI-BOX CORPORATION, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,414

(22) Filed: Jan. 5, 2023

(65) Prior Publication Data

US 2023/0144721 A1 May 11, 2023

Related U.S. Application Data

(63) Continuation of application No. 17/308,357, filed on May 5, 2021, now Pat. No. 11,560,300.

(Continued)

(51) Int. Cl.

*B67D 3/04* (2006.01)
*B65D 47/12* (2006.01)
*B65D 47/24* (2006.01)

(52) U.S. Cl.

CPC ........... *B67D 3/043* (2013.01); *B65D 47/121* (2013.01); *B65D 47/247* (2013.01); *B65D 2547/066* (2013.01)

(58) Field of Classification Search

CPC ..... B67D 3/043; B65D 47/121; B65D 47/247

See application file for complete search history.

(56) References Cited

U.S. PATENT DOCUMENTS

| | | | | |
|---|---|---|---|---|
| 4,513,889 A * | 4/1985 | Beard | .................... | B65D 83/40 222/402.1 |
| 2002/0030063 A1* | 3/2002 | Leray | ................... | B67D 3/0016 222/509 |

(Continued)

FOREIGN PATENT DOCUMENTS

| | | |
|---|---|---|
| GB | 2169061 A | 7/1986 |
| WO | 2008/117250 A2 | 10/2008 |
| WO | 2013/191915 A1 | 12/2013 |

OTHER PUBLICATIONS

PCT, Notification of Transmittal of the International Search Report and the Written Opinion of the International Searching Authority, or the Declaration, in Application No. PCT/US2021/031061, dated Sep. 8, 2021 (12 pages).

*Primary Examiner* — Jeremy Carroll

(74) *Attorney, Agent, or Firm* — McAndrews, Held & Malloy, Ltd

(57) ABSTRACT

A tap dispenser assembly for use with a fluid container including a tap body, a spring button, and a valve. The tap body includes an attachment portion, a dispensing portion, and a fluid channel with an upper wall and a lower wall. The dispensing portion includes a valve stem guide and a guide support. The guide support is above the lower wall and/or the upper wall. The valve is connected to the spring button and is slidingly inserted into the valve stem guide. The tap dispenser assembly has a closed position where the spring button is not depressed and the valve seals the dispensing portion and an open position where the spring button is (Continued)

depressed and the seal between the valve and dispensing portion is broken, allowing fluid to flow from the tap dispenser assembly.

20 Claims, 10 Drawing Sheets

Related U.S. Application Data

(60) Provisional application No. 63/020,722, filed on May 6, 2020, provisional application No. 63/020,727, filed on May 6, 2020.

(56) References Cited

U.S. PATENT DOCUMENTS

| | | | | |
|---|---|---|---|---|
| 2008/0237276 | A1* | 10/2008 | Lester | B67D 3/043 222/511 |
| 2008/0245816 | A1* | 10/2008 | Armstrong | B67B 7/24 222/518 |
| 2013/0341366 | A1* | 12/2013 | Campbell | F16K 31/52 222/505 |
| 2017/0247239 | A1* | 8/2017 | Nini | B67D 3/009 |
| 2020/0399112 | A1* | 12/2020 | Driskell | B65D 77/067 |
| 2021/0347629 | A1 | 11/2021 | Kieras | |

* cited by examiner

--PRIOR ART--

--PRIOR ART--

--PRIOR ART--

HIGH FLOW TAP FOR DISPENSING FLUIDS FROM A CONTAINER AND RELATED APPLICATIONS

CROSS-REFERENCE TO RELATED APPLICATIONS

This application is related to, and claims priority to, U.S. patent application Ser. No. 17/308,357, filed May 5, 2021 and titled "High Flow Tap For Dispensing Fluids From A Container And Related Applications," which is related to, and claims priority to, U.S. Provisional Application No. 63/020,722, filed May 6, 2020, titled "High Flow Tap" and U.S. Provisional Application No. 63/020,727, filed May 6, 2020, titled "Super Flow Tap." The complete subject matter and contents of U.S. patent application Ser. No. 17/308,357, U.S. Provisional Application No. 63/020,722, and U.S. Provisional Application No. 63/020,727 are incorporated herein by reference in their entirety.

BACKGROUND

The present disclosure relates to tap dispensers for fluid containers, and more particularly to a tap dispenser with a flexible button connected to a movable stem of a valve to selectively allow or prevent flow of liquid out of the tap dispenser.

Generally, tap dispensers with flexible buttons are used with disposable fluid containers. These containers may be a rigid container, a flexible container, or a bag in box container. These containers can hold various types of liquids with different viscosities. It is generally desirable to increase the flow rate out of the tap dispenser for highly viscous fluids while still being able to stop the flow out of the tap once the dispensing is complete.

SUMMARY

Certain embodiments of the present technology include a tap dispenser for use with a fluid container. The tap dispenser includes a tap body, a spring button, and a valve. The tap body includes an attachment portion, a channel portion, and a dispensing portion. The attachment portion is configured to connect to the spout of the fluid container. The channel portion fluidly connects the attachment portion and dispensing portion and also includes a lower wall. The dispensing portion includes a valve stem guide. The valve stem guide being above the fluid channel lower wall. The spring button sealingly attached to the dispensing portion. The valve having a valve body and a valve stem. The valve stem being attached to the spring button and slidingly inserted through the valve stem guide. The tap dispenser having a closed position where the spring button is not depressed and the valve body is in contact with the valve sealing surface preventing fluid from flowing out of the dispensing portion. The tap dispenser having an open position where the spring button is depressed and the valve body is not in contact with the valve sealing surface allowing fluid to flow out of the dispensing portion.

The dispensing portion may include a guide support connected to the valve stem guide, and the guide support may be above the channel portion lower wall.

The dispensing portion may include an inner wall and the guide support may be located on the inner wall radially opposite the channel portion.

The dispensing portion may include a valve sealing surface and a protective shroud. The protective shroud may be spaced radially outward from the valve sealing surface.

The protective shroud may extend below the dispensing portion valve sealing surface.

The valve may include a valve stem that is received in the valve stem guide, a sealing portion that engages the valve sealing surface when the tap dispenser is in the closed position, and a flat portion that connects the sealing portion with the valve stem.

The attachment portion may be threadably connected to the fluid container.

The tap dispenser may include an anti-tamper cap that removably covers the spring button and prevents the spring button from being depressed while the anti-tamper cap is installed.

The dispensing portion may include finger supports that include locking holes. The anti-tamper cap may include a cover portion and locking tabs. The locking holes may retain the locking tabs before and after the cover portion is removed.

The anti-tamper cap cover portion may include a removal tab.

Certain embodiments of the present technology include a tap dispenser for use with a fluid container. The assembly includes a tap body, a spring button, and a valve. The tap body includes an attachment portion, a channel portion, and a dispensing portion. The attachment portion is configured to connect to the spout of the fluid container. The channel portion fluidly connects the attachment portion and dispensing portion and also includes an upper wall. The dispensing portion includes a valve stem guide. The valve stem guide being above the fluid channel upper wall. The spring button being sealingly attached to the dispensing portion. The valve being attached to the spring button and slidingly inserted through the valve stem guide. The tap dispenser having a closed position where the spring button is not depressed and the valve is in contact with the dispensing portion preventing fluid from flowing out of the dispensing portion. The tap dispenser having an open position where the spring button is depressed and the valve body is not in contact with the dispensing portion allowing fluid to flow out of the dispensing portion.

The dispensing portion may include a guide support connected to the valve stem guide, and the guide support may be above the channel portion upper wall.

The dispensing portion may include a button attachment wall and an upper chamber. The upper chamber may be located above the guide support and below the button attachment wall.

The dispensing portion may include a valve sealing surface and a protective shroud. The protective shroud may be spaced radially outward from the valve sealing surface.

The protective shroud may extend below the dispensing portion valve sealing surface.

The valve may include a valve stem with a lower portion and an upper portion. The lower portion may be thicker than the upper portion and being slidably received in the valve stem guide.

The dispensing portion may include a valve sealing surface and a tapered surface. The tapered surface may be directly above the valve sealing surface. The valve may include a flexible seal surface, wherein the flexible seal surface. The flexible seal surface may flexibly engage the valve sealing surface when the tap dispenser is in the closed position.

The tap dispenser may include an anti-tamper cap that removably covers the spring button and prevents the spring button from being depressed while the anti-tamper cap is installed.

The dispensing portion may include finger supports that include locking holes. The anti-tamper cap may include a cover portion and locking tabs. The locking holes may retain the locking tabs before and after the cover portion is removed.

The anti-tamper cap cover portion may include a removal tab.

DETAILED DESCRIPTION

Disclosed are example tap dispenser assemblies with a tap body, flexible button, valve stem, and valve seal configured for use with rigid wall, flexible containers, or bag in box style containers configured for the storage and dispensing of fluid products. The tap dispenser assemblies are configured to regulate flow out of, and/or selectively seal, a liquid container and may include an in use position and a standby position. The tap dispenser assemblies may also include a tamper evident cap for covering the flexible button to show evidence of prior use of the container.

Figure 1:
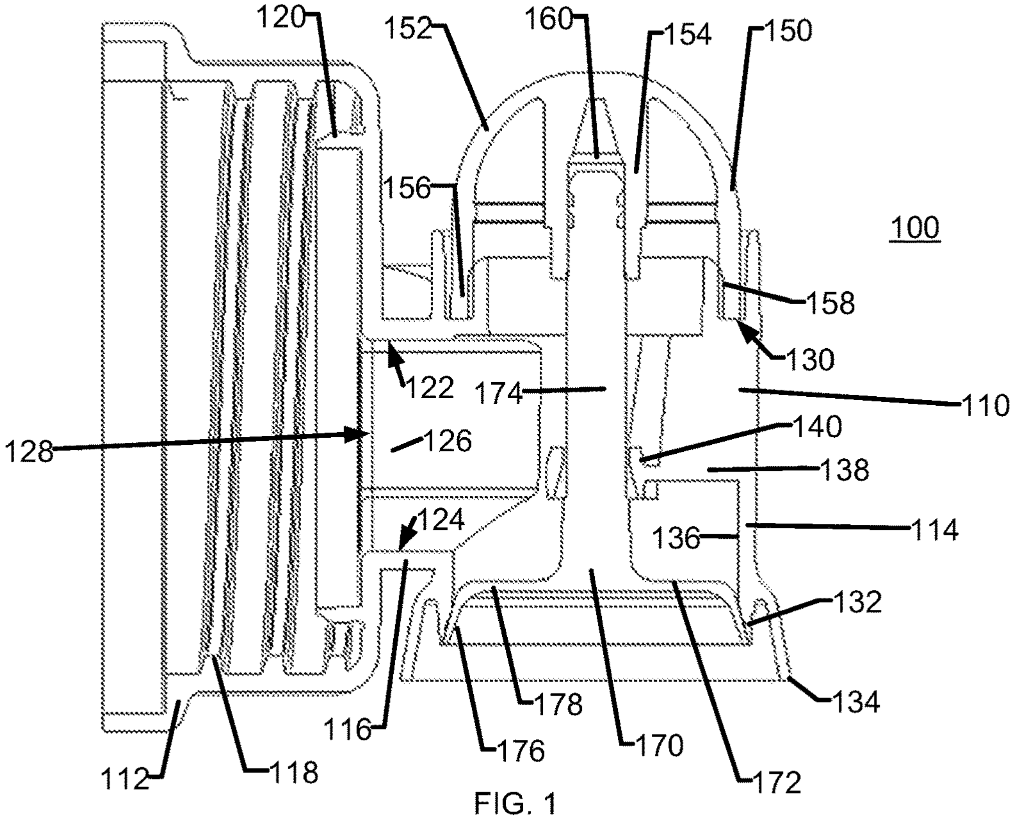
FIG. 1 is a cross section view of a tap dispenser assembly having a tap body, a spring button, and a valve in a closed position, in accordance with aspects of this disclosure.

Turning now to the drawings, FIG. 1 is a cross section view of a tap dispenser assembly 100 in a closed position. The dispenser assembly 100 includes a tap body 110, a spring button 150, and a valve 170.

The tap body 110 has a generally cylindrical attachment portion 112, a dispensing portion 114, and a channel portion 116. The attachment portion 112 connects to a spout of an associated fluid container. The attachment portion 112 may include internal threads 118 to correspond with external threads of the container spout. The attachment portion 112 also includes a sealing surface 120 to create a seal between the tap body 110 and the container spout when the dispenser assembly 100 is attached to the container. The channel portion 116 has an upper wall 122, a lower wall 124, and side walls 126. The upper wall 122, the lower wall 124, and the side walls 126 define a fluid flow passage 128 that fluidly connects the attachment portion 112 with the dispensing portion 114.

The dispensing portion 114 houses the spring button 150 and the valve 170. The dispensing portion 114 includes a button attachment groove 130 for receiving a portion of the spring button 150. The dispensing portion 114 also includes a sealing surface 132. A protective shroud 134 extends from the dispensing portion 114 and surrounds the sealing surface 132. The protective shroud 134 is spaced radially outward from the sealing surface 132 and extends below the sealing surface 132. The dispensing portion 114 has an inner wall 136. A guide support 138 extends from the inner wall 136 and attaches to a valve stem guide 140. The guide support 138 is located opposite the channel portion 116 within the dispensing portion 114. The guide support 138 and the valve stem guide 140 are above the channel portion lower wall 124. In some embodiments, the tap body 110 is made of ethylene, polypropylene, or some other similar rigid plastic.

The spring button 150 has a domed flexible portion 152, a stem receiving portion 154, and a sealing portion 156. The sealing portion 156 is installed into the button attachment groove 130. Once installed, the sealing portion 156 secures the spring button to the tap body 110 and creates a fluid seal 158 between the spring button 150 and the tap body 110. The stem receiving portion 154 forms a stem opening 160. The spring button 150 may be made of a thermoplastic elastomer.

The valve 170 includes a valve body 172 and a valve stem 174. During assembly, the valve stem 174 is slidably inserted through the valve stem guide 140 and is held within the stem opening 160 of the spring button 150. The valve body 172 includes a flexible seal surface 176. In the closed position, the flexible seal surface 176 creates a seal against the sealing surface 132 of the tap body dispensing portion 114, preventing fluid from flowing out of the tap dispensing assembly 100. The valve body 172 includes a flat portion 178 between the flexible seal surface 176 and the valve stem 174.

Figure 2:
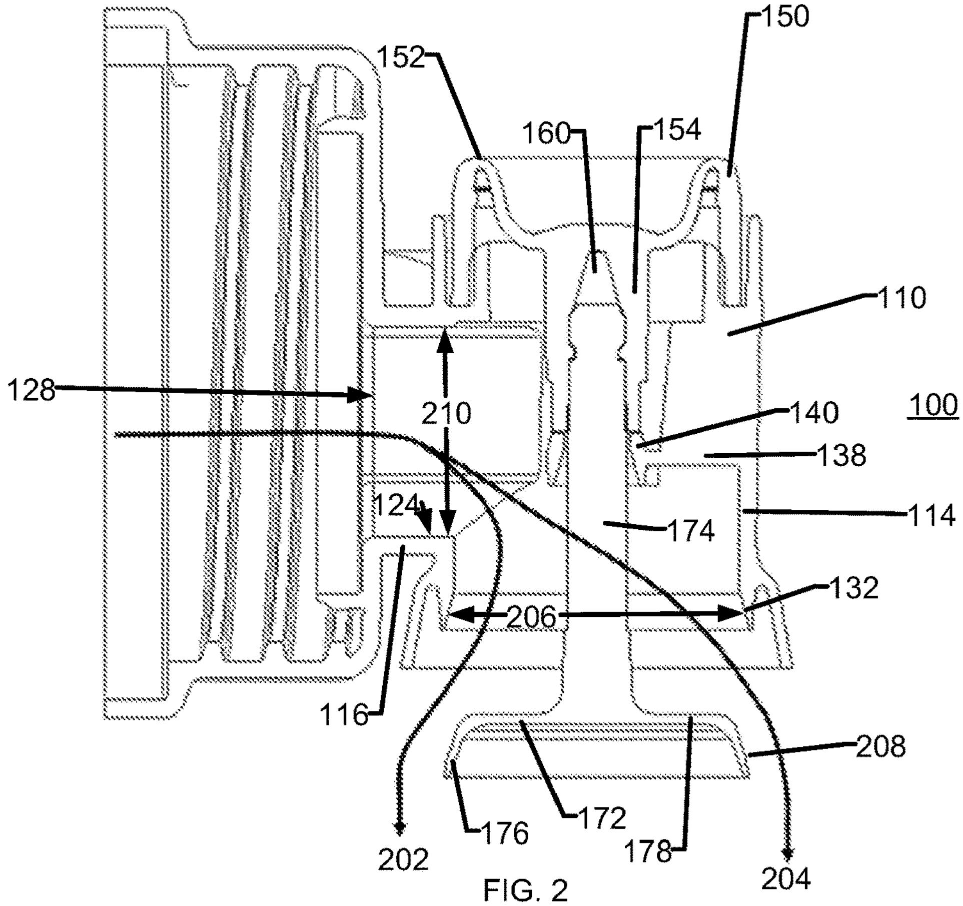
FIG. 2 is cross section view of the tap dispenser assembly of FIG. 1 in an open position.

FIG. 2 is a cross section view of the tap dispenser assembly 100 of FIG. 1 in an open position. To place the tap dispenser assembly 100 in the open position, a user depresses the spring button 150 downward, deforming the flexible portion 152. The stem receiving portion 154 moves downward towards the valve stem guide 140 of the tap body 110. In the open position, the stem receiving portion 154 may abut against the valve stem guide 140 and provide a lower limit of travel for the stem receiving portion 154. The stem receiving portion 154 retains the valve stem 174 within the stem opening 160 while the valve stem 174 slides through the valve stem guide 140 from the closed to the open position. The flexible seal surface 176 of the valve body 172 separates from the dispensing portion sealing surface 132 creating a flow path 202 from the container, through the fluid flow channel 128, out of the dispensing portion 114, and around the flexible seal surface 176. A flow path portion 204 flows between the guide support 138 and the flat portion 178 of the valve body 172.

Once the user no longer desires to dispense fluid from the tap dispenser assembly 100, the user removes the force from the top of the spring button 150, and the flexible portion 152 springs the spring button 150 back to the closed position, moving the stem receiving portion 154, the valve stem 174, and the valve body 172 back to the closed position as well. This results in the contact between the flexible seal surface 176 and the dispensing portion sealing surface 132 eliminating the flow path 202 and the flow path portion 204 and sealing the tap dispenser assembly 100.

While the tap dispenser assembly 100 is in the open position, the guide support 138 being located opposite the fluid flow channel 128 and above the lower wall 124 helps minimize the turbulence and flow resistance of the flow path portion 204 and the flow path 202 overall. The single guide support 138 at a single location, the shape of the guide support 138, and the shape of the flat portion 178 of the valve body 172 further reduce the turbulence and flow resistance. Additionally, the sealing surface 132 has a diameter 206 of about 0.800 inches as compared to previous designs that had a sealing surface diameter of 0.600 inches. The diameter 206 is measured on the sealing surface 132 corresponding to the location of a sealing bead 208 on the flexible sealing surface 176 when the tap assembly 100 is in the closed position. In other embodiments, the sealing surface diameter is in the range of 0.650 inches to 0.950 inches. The fluid flow channel 128 within the channel portion 116 has a cross sectional area 210. The cross sectional area 210 of this embodiments is about 0.364 $in^2$ as compared to previous designs that had a cross sectional area of 0.2217 $in^2$. In other embodiments, the cross sectional area is in the range of 0.250 $in^2$ to 0.506 $in^2$. The larger sealing surface diameter 206 and cross sectional area 210 further minimize the flow resistance while dispensing fluid. By minimizing this turbulence and flow resistance, increased flow rates are achieved during dispensing as compared to previous tap dispenser assembly designs, particularly for highly viscous liquids.

Figure 3A:
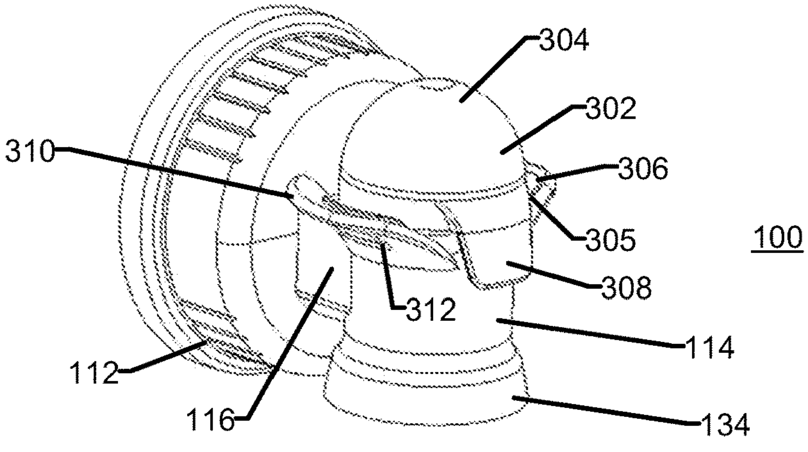
FIG. 3A is a perspective view of the tap dispenser assembly of FIG. 1 in the closed position with an anti-tamper cap installed.
Figure 3B:
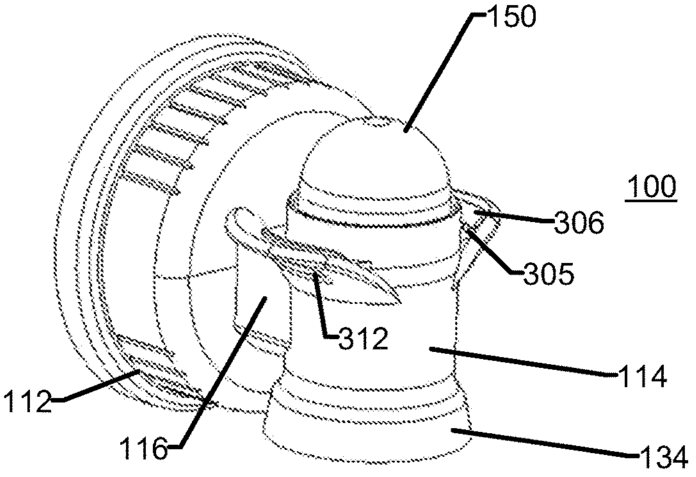
FIG. 3B is a perspective view of the tap dispenser assembly of FIG. 1 in the closed position with the anti-tamper cap removed.
Figure 3C:
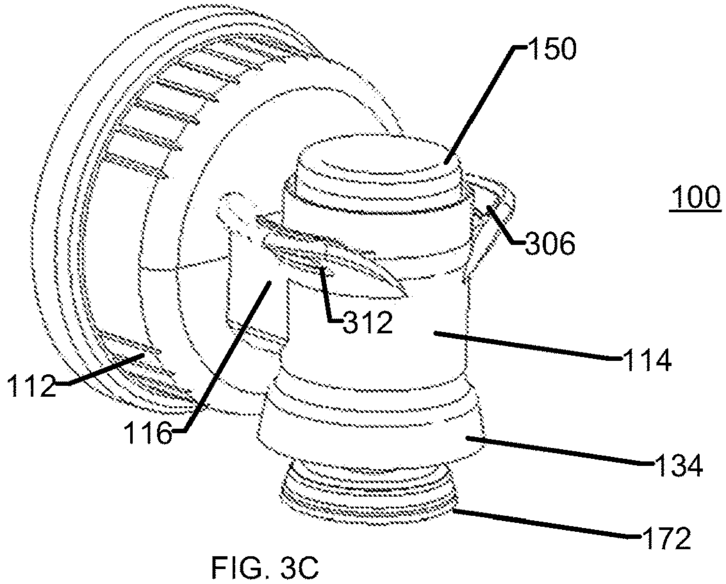
FIG. 3C is a perspective view of the tap dispenser assembly of FIG. 1 in the open position with the anti-tamper cap removed.

FIG. 3A is a perspective view of the tap dispenser assembly 100 of FIG. 1 in the closed position with an anti-tamper cap 302 installed. FIG. 3B is a perspective view of the tap dispenser assembly 100 of FIG. 1 in the closed position with the anti-tamper cap 302 removed. FIG. 3C is a perspective view of the tap dispenser assembly 100 of FIG. 1 in the open position with the anti-tamper cap 302 removed.

In FIG. 3A, the attachment portion 112, the dispensing portion 114, and the channel portion 116 of the tap body 110 are shown. The anti-tamper cap 302 includes a domed cover portion 304, two locking tabs 306, and a removal tab 308. The cover portion 304 is made of a rigid plastic. The locking tabs 306 are connected to the cover portion 304 by a scored surface 305. When installed as in FIG. 3A, the cover portion 304 covers the spring button 150 and prevents the spring button 150 from being depressed. The dispensing portion 114 includes two finger supports 310 on either side of the dispensing portion 114. The finger supports 310 provide a location for a user to grip and provide a counter force while the user depresses the spring button 150 during the dispensing of fluid. The finger supports 310 are curved and angled upward to be more comfortable and ergonomic during use as compared to previous designs that were flat and extended horizontally from the tap body. The finger supports 310 include locking holes 312. Each locking hole 312 receives a corresponding locking tab 306 of the anti-tamper cap 302. The locking tabs 306 are secured within the locking holes 312 with a snap fit connection, an adhesive, by sonically welding the components together, and/or other similar form of attaching the components to prevent the locking tab 306 from subsequent removal from the locking holes 312. The removal tab 308 extends from the cover portion 304.

As seen in FIG. 3B, prior to use of the tap dispenser assembly 100, the user pushes upon the removal tab 308. The cover portion 304 separates from, i.e., breaks off of, the locking tabs 306 along the scored surface 305, thereby exposing the spring button 150. The locking tabs 306 remain within the locking holes 312 and provide an indication to users the cover portion 304 of the tamper evident cap 302 has been removed.

FIG. 3C shows the tap dispenser assembly 100 in the open position with the spring button 150 pressed down and the valve body 172 extending below the protective shroud 134. The locking tabs 306 within the locking holes 312 do not affect the ability of the tap dispenser assembly 100 to move to the open position once the cover portion 304 is removed.

Figure 4:
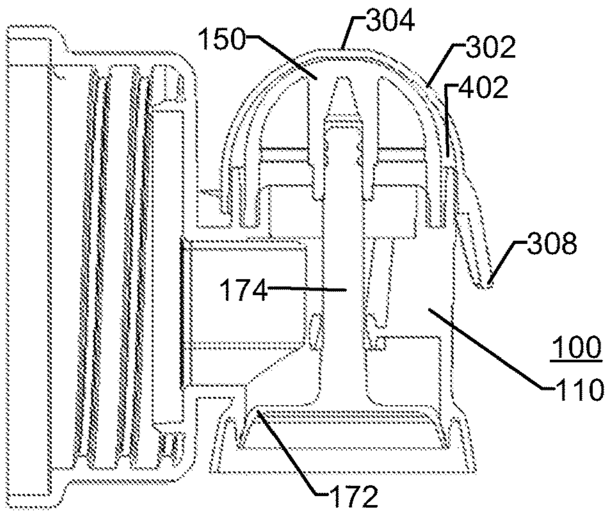
FIG. 4 is a cross section view of the tap dispenser assembly of FIG. 1 in the closed position with the anti-tamper cap installed.

FIG. 4 is a cross section view of the tap dispenser assembly 100 of FIG. 1 with the anti-tamper cap 302 installed. The cover portion 304 of the anti-tamper cap 302 has a similar domed shape as the spring button 150 but a gap 402 is formed between the cover portion 304 and the spring button 150 to prevent inadvertent movement of the spring button 150, thereby preventing movement of the valve stem 174 and valve body 172 and resulting leakage of fluid. The removal tab 308 is spaced slightly from, and angles downwardly away from, a portion of the tap body 110 to allow for the user to remove the cover portion 304 with the user's fingers instead of requiring a special tool.

Figure 5A:
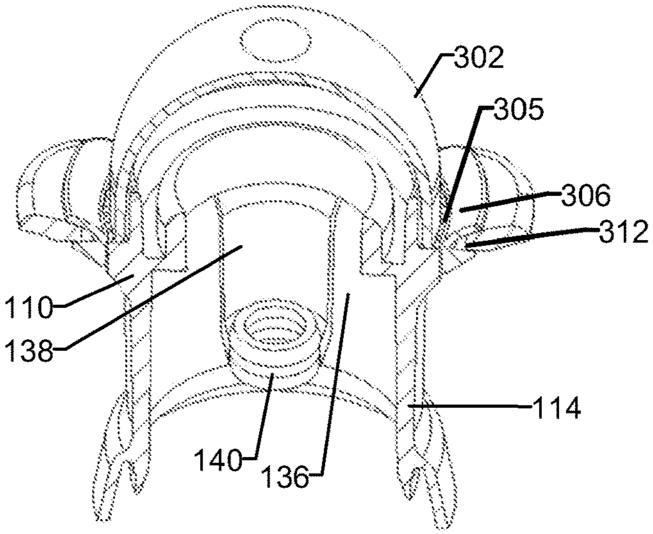
FIG. 5A is a cross section perspective view of the tap body dispensing portion of FIG. 1 with the anti-tamper cap installed.
Figure 5B:
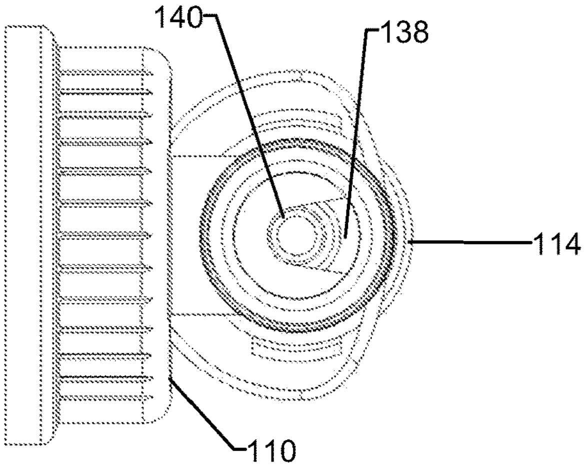
FIG. 5B is a top view of the tap body of FIG. 1.

FIG. 5A is a cross section perspective view of the tap body dispensing portion 114 of the tap body 110 of FIG. 1 with the anti-tamper cap 302 of FIG. 3A installed. FIG. 5B is a top view of the tap body 110 of FIG. 1.

The guide support 138 extends from the inner wall 136 and attaches to the valve stem guide 140. The guide support 138 at the inner wall 136 is wider than the outer diameter of the valve stem guide 140. That is, the guide support 138 tapers as it extends radially inward. The guide support 138 extends upward to approximately the same height as the upper wall 122 (FIG. 1) of the fluid flow passage 128 (FIG. 1). The guide support 138 of the present embodiment may be larger than the support arms of prior art dispenser tap assemblies that include multiple support arms, but the location of the guide support 138 across from the fluid flow passage 128 and above the lower channel wall 124 compensates for the larger size.

The locking tabs 306 of the anti-tamper cap 302 snappingly engage the locking holes 312 of the dispensing portion 114. The scored surface 305 connects the locking tabs 306 with the cover portion 304 of the anti-tamper cap 302.

Figure 6:
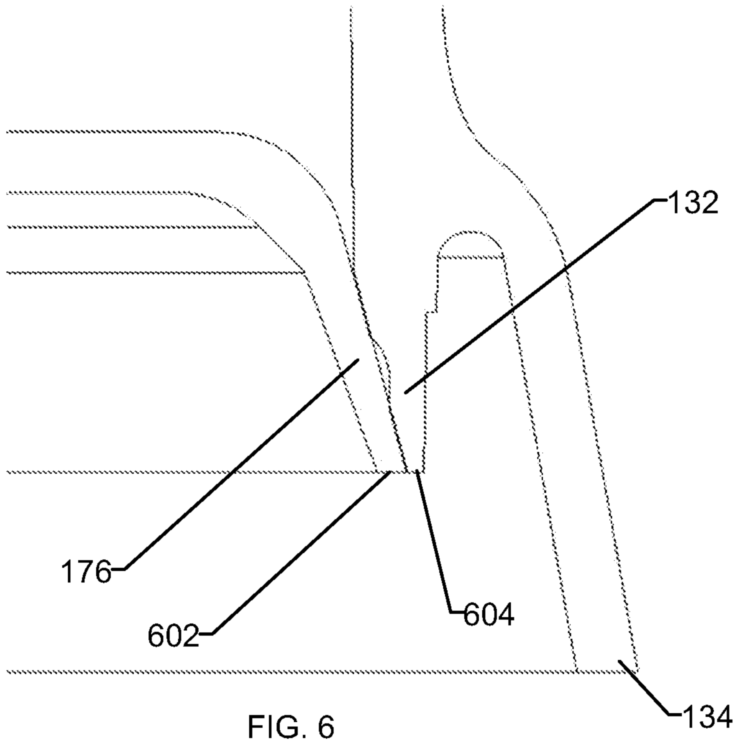
FIG. 6 is an enlarged view of a portion of the valve and tap body of the tap dispenser assembly of FIG. 1.

FIG. 6 is an enlarged view of the valve body flexible seal surface 176, the dispensing portion sealing surface 132, and the dispensing portion shroud 134 of FIG. 1.

The valve body flexible seal surface 176 may have a thickness at a lower edge 602 of 0.014 inches. The dispensing portion sealing surface 132 may have a thickness at a lower edge 604 of 0.008 inches. In some prior art flexible tap dispensers, the thickness at the lower edge of the valve body flexible seal surface is 0.024 inches and the thickness at the lower edge of the dispensing portion sealing surface is 0.016 inches. The reduced thicknesses of flexible seal surface lower edge 602 and the dispensing portion sealing surface lower edge 604 of the present embodiment allow the valve body flexible seal surface 176 and the dispensing portion sealing surface 132 to better conform and create a better seal to each other. The increased sealing capability, as a result of the reduced thickness of the flexible seal surface lower edge 602, is especially helpful in high solids product applications. The dispensing portion shroud 134 provides additional protection from inadvertent contact of the valve lower edge 602 and the dispensing portion sealing surface lower edge 604 by extending below and radially outward from the valve body flexible seal surface 176 and the dispensing portion sealing surface 132.

Figure 7:
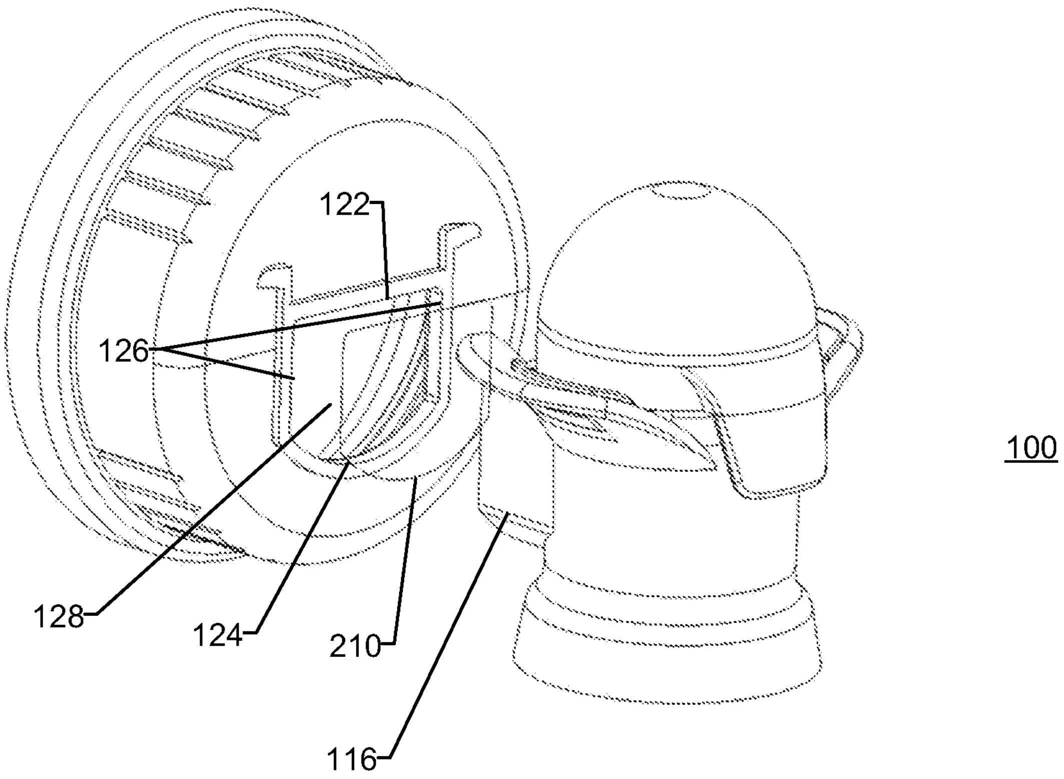
FIG. 7 is a perspective view of the tap dispenser assembly of FIG. 1 with the tap body sectioned.

FIG. 7 is a perspective view of the tap dispenser assembly 100 of FIG. 1 sectioned through the channel portion 116. The cross sectional area 210 of the fluid flow channel 128 within the channel portion 116 is formed between the upper wall 122, the lower wall, 124, and the side walls 126 as described above.

Figure 8A:
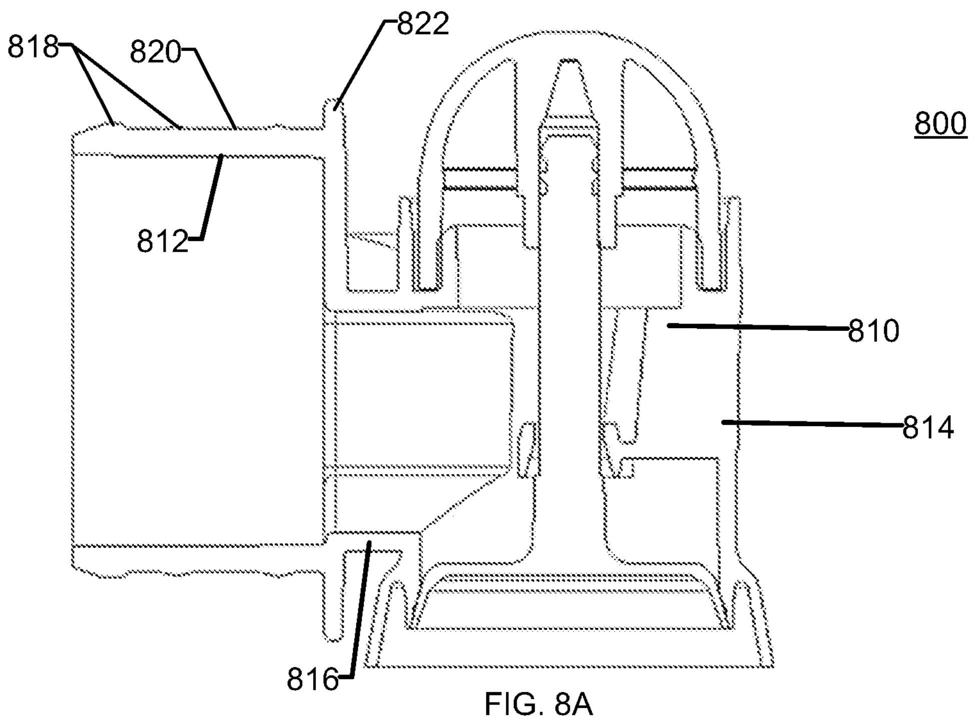
FIG. 8A is a cross section view of a tap dispenser assembly similar to the tap dispenser assembly of FIG. 1 with an alternate attachment portion, in accordance with aspects of this disclosure.
Figure 8B:
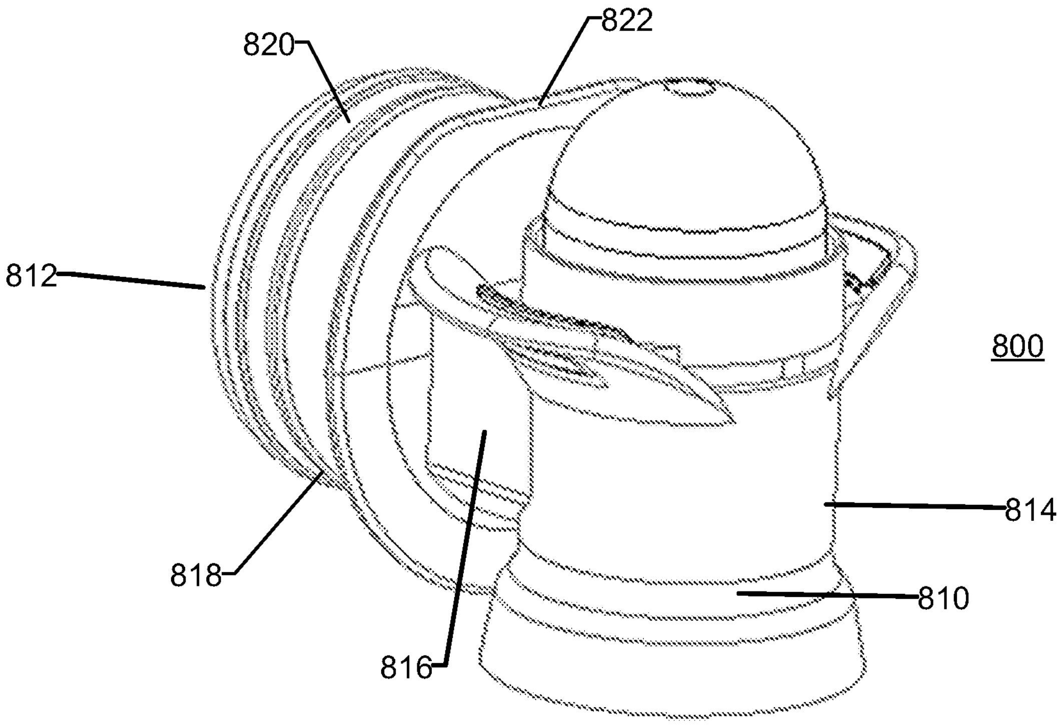
FIG. 8B is a perspective view of the tap dispenser assembly of FIG. 8A.

FIG. 8A is a cross section view of a tap dispenser assembly 800 similar to that of FIG. 1, with an alternate attachment portion 812, in the closed position. FIG. 8B is a perspective view of the tap dispenser assembly 800 of FIG. 8A in the closed position.

Similar to the tap dispenser assembly 100 of FIG. 1, the tap dispenser assembly 800 of FIGS. 8A and 8B includes a tap body 810 with a cylindrical attachment portion 812, a dispensing portion 814, and a channel portion 816. Instead of the internal threads 118 of the first embodiment, the attachment portion 812 of this embodiment includes one or more protrusions 818 on an outer surface 820 of the attachment portion 812. The attachment portion 812 is configured to be inserted within a spout of a container such as a bag in box type container, e.g., the protrusions 818 may be received in corresponding channels in an interior wall of the spout. Once within the container's spout, the protrusions 818 may be used to seal and/or secure the attachment portion 812 within the spout. The attachment portion 812 also includes a flange 822. The flange 812 may abut against the container spout and provide an inner limit on how far the attachment portion 812 may be inserted with the spout. In some embodiments, the attachment portion may attach to the container with a cork style seal press on attachment.

Figure 9:
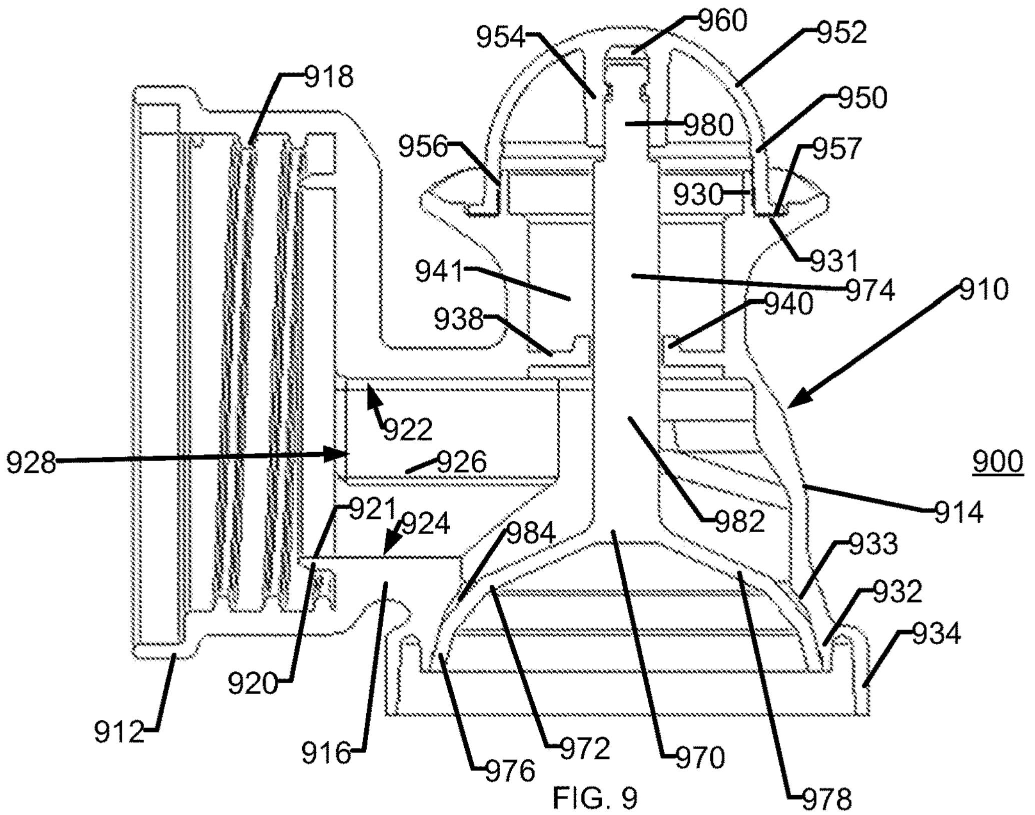
FIG. 9 is a cross section view of a second embodiment of a tap dispenser assembly with a tap body, a spring button, and a valve, in accordance with aspects of this disclosure.

FIG. 9 is a cross section view of an alternative tap dispenser assembly 900 in a closed position. Similar to the tap dispenser assembly 100 of FIG. 1, the tap dispenser assembly includes a tap body 910, a spring button 950, and a valve 970.

The tap body 910 of this embodiment has a generally cylindrical attachment portion 912, a dispensing portion 914, and a channel portion 916. The attachment portion 912 may include internal threads 918 and a sealing protrusion 920 similar or identical to the attachment portion 112 of FIG. 1 to allow the attachment portion 912 to connect and seal to the spout of a container. The channel portion 916 also has an upper wall 922, a lower wall 924, and side walls 926. The upper wall 922, the lower wall 924, and the side walls 926 define a fluid flow passage 928 that fluidly connects the attachment portion 912 with the dispensing portion 914. In this embodiment, the lower wall 924 aligns with the inner surface 921 of the sealing protrusion 920.

The dispensing portion 914 houses the spring button 950 and the valve 970. The dispensing portion 914 has a button attachment wall 930 and button attachment base 931. The dispensing portion 914 also has a sealing surface 932, a lower tapered surface 933, and a protective shroud 934. Similar to the first embodiment of FIG. 1, the dispensing portion 914 includes a valve stem guide 940 and guide supports 938 to connect the valve stem guide 940 to the dispensing portion 914. However, unlike the first embodiment, the dispensing portion 914 has more than one guide support 938, and the guide supports 938 and the valve stem guide 940 are above the upper wall 922 and the fluid flow passage 928. The volume above the guide supports 938 and below the button attachment wall 930 forms an upper cavity 941 within the dispensing portion 914. In some embodiments, the tap body 910 is made of ethylene, polypropylene, or some other similar rigid plastic.

The spring button 950 has a domed flexible portion 952, a stem receiving portion 954, an inner sealing portion 956, and a lower sealing portion 957. The inner sealing portion 956 is secured to the button attachment wall 930 and the lower sealing portion 957 is secured to the button attachment base 931 to secure and create a seal between the spring button 950 and the dispensing portion 914. The stem receiving portion 954 forms a stem opening 960. The spring button 950 may be made of a thermoplastic elastomer.

The valve 970 includes a valve body 972 and a valve stem 974. The valve stem 974 has an upper portion 980 and a lower portion 982. The lower portion 982 is thicker, e.g., has a greater diameter, than the upper portion 980. In some embodiments, the upper portion 980 has a diameter of 0.150 inches and the lower portion 982 has a diameter of 0.220 inches. During assembly, the valve stem upper portion 980 is inserted and held within the stem opening 960 of the flexible button 950 while the lower portion 982 is slidably held within the valve stem guide 940. The valve body 972 includes a flexible seal surface 976 and a domed portion 978 between the valve stem lower portion 982 and the flexible seal surface 976. In the closed position, the flexible seal surface 976 creates a seal against the sealing surface 932 of the tap body dispensing portion 914, preventing fluid from flowing out of the tap dispensing assembly 900. The lower tapered surface 933 and a portion of the valve body domed portion 978 form a gap 984 in the closed position.

Figure 10:
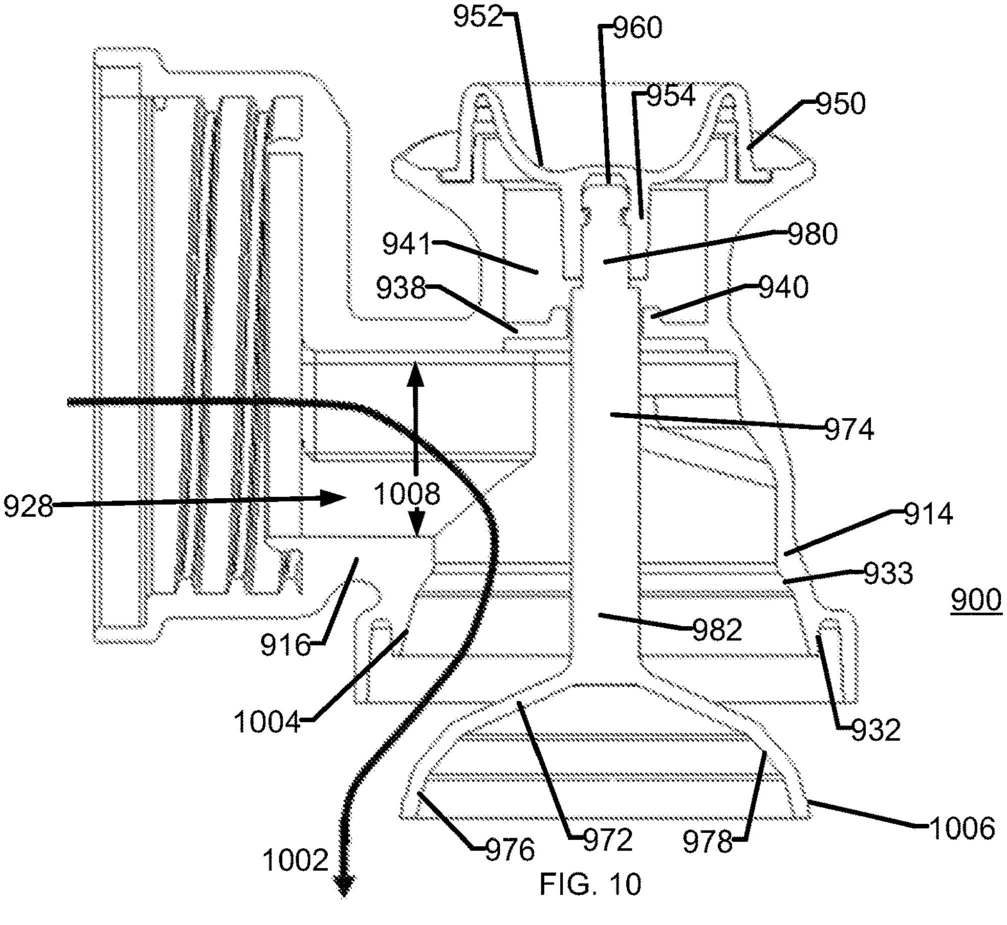
FIG. 10 is a cross section view of the tap dispenser assembly of FIG. 9 in an open position.

FIG. 10 is a cross section view of the tap dispenser assembly 900 of FIG. 9 in an open position. To place the tap dispenser assembly 900 in the open position, a user depresses the spring button 950 downward deforming the flexible portion 952. The stem receiving portion 954 moves downward towards the valve stem guide 940 and into the upper cavity 941. The stem receiving portion 954 retains the valve stem upper portion 980 within the stem opening 960 while the valve stem lower portion 982 slides downwardly through the valve stem guide 940 from the closed to the open position. The larger diameter of the valve stem lower portion 982 provides greater rigidity to the valve stem 974, which helps keep the valve body 972 centered within the dispensing portion 914 and compensate for the distance between the valve stem guide 940 and the dispensing portion sealing surface 932. The flexible seal surface 976 of the valve body 972 separates from the dispensing portion sealing surface 932, creating a flow path 1002 from the container, through the fluid flow channel 928, out of the dispensing portion 914, and around flexible seal surface 976.

Once the user no longer desires to dispense fluid from the tap dispenser assembly 900, the user removes the force from the top of the spring button 950, and the flexible portion 952 springs back to the closed position, moving the stem receiving portion 954, the valve stem 974, and the valve body 972 back to the closed position as well. This results in the re-engagement and contact between the flexible seal surface 976 and the dispensing portion sealing surface 932, closing the flow path 1002 and sealing the tap dispenser assembly 900.

Due to the guide supports 938 and valve stem guide 940 being above the fluid flow passage 928, the guide supports 938 and valve stem guide 940 do not obstruct the flow path 1002 of the fluid, regardless of the number and shape of the guide supports 938. Additionally, the sealing surface 932 of this embodiment has a diameter 1004 of about 1.300 inches. In other embodiments, the sealing surface diameter is in the range of 0.900 inches to 1.600 inches. The diameter 1004 is measured on the sealing surface 932 corresponding to the location of the sealing bead 1006 on the flexible sealing surface 976 when the tap assembly 900 is in the closed position. The fluid flow channel 928 within the channel portion 916 has a cross sectional area 1008. The cross sectional area 1008 of this embodiment is about 0.523 $in^2$. In other embodiments, the cross sectional area is in the range of 0.250 $in^2$ to 0.796 $in^2$. The lower tapered surface 933 (which flares radially outward as it extends downward) combined with the valve body domed portion 978 further minimizes turbulence in the flow path 1002 as the fluid exits the dispensing portion 914. As with the first embodiment, by minimizing this turbulence and flow resistance, increased flow rates are achieved during dispensing as compared to previous tap dispenser assembly designs, particularly for highly viscous liquids.

Figure 11A:
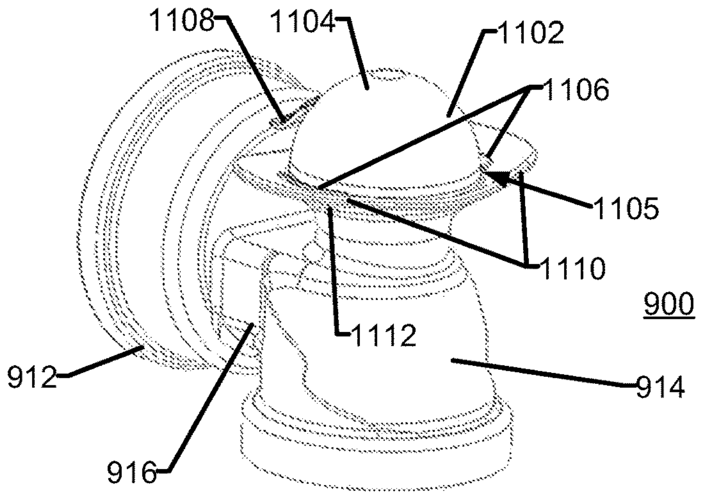
FIG. 11A is a perspective view of the tap dispenser assembly of FIG. 9 in the closed position with an anti-tamper cap installed.
Figure 11B:
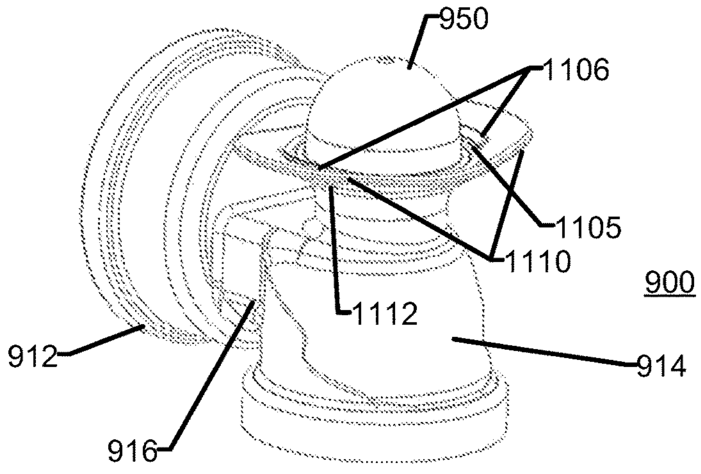
FIG. 11B is a perspective view of the tap dispenser assembly of FIG. 9 in the closed position with the anti-tamper cap removed.
Figure 11C:
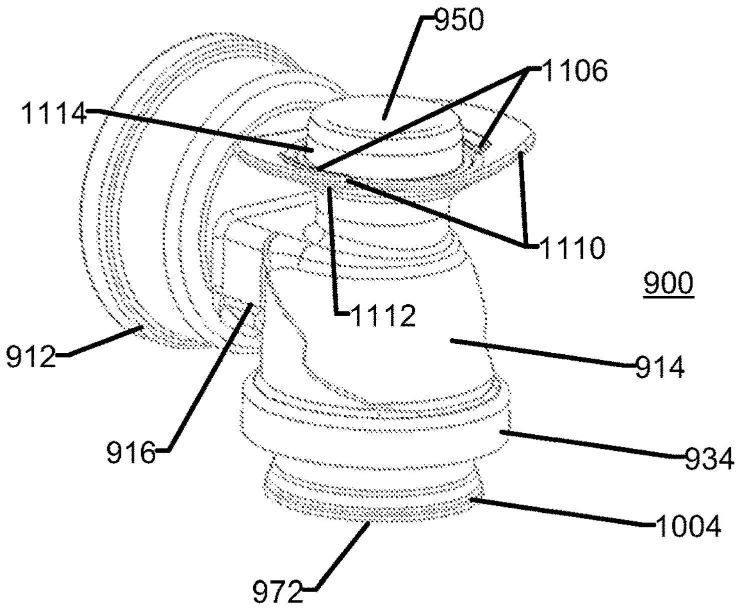
FIG. 11C is a perspective view of the tap dispenser assembly of FIG. 9 in the open position with the anti-tamper cap removed.

FIG. 11A is a perspective view of the tap dispenser assembly 900 of FIG. 9 in the closed position with an anti-tamper cap 1102 installed. FIG. 11B is a perspective view of the tap dispenser assembly 900 of FIG. 9 in the closed position with the anti-tamper cap 1102 removed. FIG. 11C is a perspective view of the tap dispenser assembly 900 of FIG. 9 in the open position with the anti-tamper cap 1102 removed.

In FIG. 11A, the outer portions of the attachment portion 912, the dispensing portion 914, and the channel portion 916 are shown. The anti-tamper cap 1102 includes a cover portion 1104, two locking tabs 1106, and a removal tab 1108. The locking tabs 1106 are connected to the cover portion 1104 by a scored surface 1105. The anti-tamper cap 1102 is made of rigid plastic and prevents the spring button 950 from being depressed when the anti-tamper cap 1102 is installed. The dispensing portion 914 includes two finger supports 1110 on either side of the dispensing portion 914. The finger supports 1110 are curved and angled upward to be ergonomical. The finger supports include locking holes 1112 to receive and secure the locking tabs 1106 of the anti-tamper cap 1102. The removal tab 1108 extends downward and radially outwardly from the cover portion 1104. As shown, the removal tab 1108 extends towards the attachment portion 912 of the tap dispenser assembly 900. Orienting the removal tab 1108 in this direction may help minimize the risk of inadvertent removal of the anti-tamper cap 1102. In other embodiments, the anti-tamper cap 1102 may be installed such that the removal tab 1108 extends away from the attachment portion 912 in a way and direction similar to that of the anti-tamper cap 302 and removal tab 308 of FIG. 3A. Alternatively, the anti-tamper cap 302 and removal tab 308 of the tap 100 may be structured and oriented like the anti-tamper cap 1102 and removal tab 1108 shown in FIGS. 11A-11C.

Prior to use of the tap dispenser assembly 900, the user pulls up on the removal tab 1108. The cover portion 1104 to separates from (e.g., breaks off of) the locking tabs 1106 along the scored surface 1105, thereby exposing the spring button 950 as seen in FIG. 11B. The locking tabs 1106 remain within the locking holes 1112 and provide an indication to users that the cover portion 1104 of the tamper evident cap 1102 has been removed.

FIG. 11C shows the tap dispenser assembly 900 in the open position with the spring button 950 pressed down and the valve body 972 extending below the protective shroud 934. The spring button 950 has an outer diameter 1114 of 0.950 inches as compared to previous designs that had an outer diameter of 0.780 inches. In other embodiments, the sealing surface diameter is in the range of 0.800 inches to 1.100 inches. As a result of the larger diameter, the spring button 950 of the present embodiment creates an upward force in the fully open position of 42 Newtons as compared to previous designs that only created 35 Newtons of upward force in the fully open position. The additional force compensates for the larger sealing surface diameter 1004 of the valve body 972. The spring button 950 is 0.660 inches tall as compared to previous designs that were 0.640 inches tall.

Figure 12:
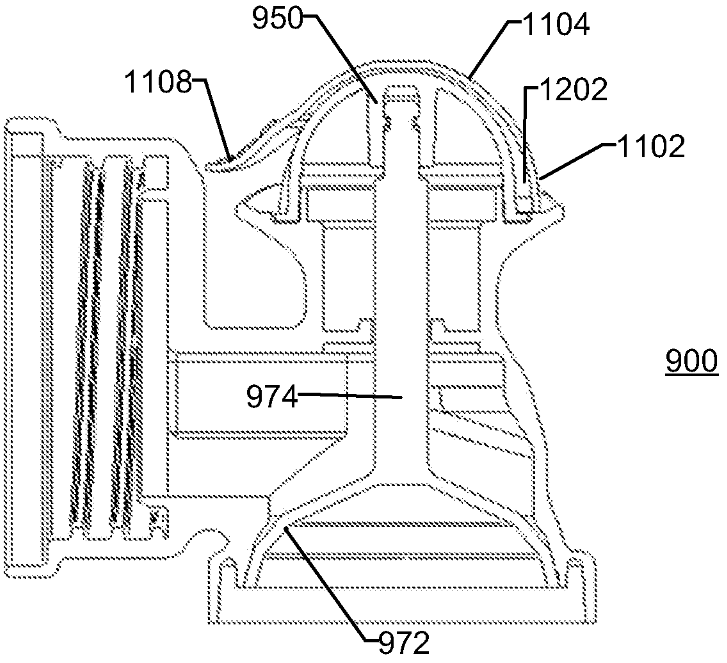
FIG. 12 is a cross section view of the tap dispenser assembly of FIG. 9 in the closed position with the anti-tamper cap installed.

FIG. 12 is a cross section view of the tap dispenser assembly 900 of FIG. 9 with the anti-tamper cap 1102 installed. The cover portion 1104 of the anti-tamper cap 1102 has a similar domed shape as the spring button 950 but a gap 1202 is formed between the cover portion 1104 and the spring button 950 to prevent inadvertent movement of the spring button 950, thereby preventing movement of the valve stem 974 and valve body 972 and thereby preventing leakage of fluid. The removal tab 1108 is spaced slightly from the tap body 110 to allow for the user to remove the cover portion 1104 with the user's fingers instead of requiring a special tool.

Figure 13:
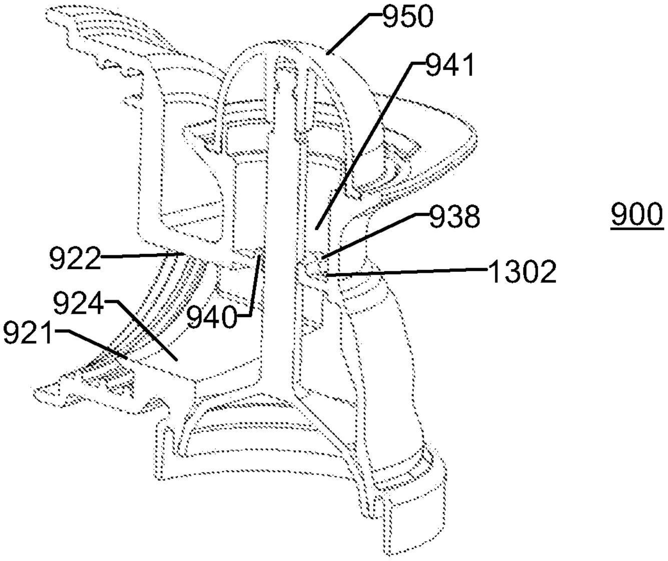
FIG. 13 is a perspective cross section view of the tap dispenser assembly of FIG. 9.

FIG. 13 shows a perspective cross section view of the tap dispenser assembly 900 of FIG. 9. The present embodiment has four guide supports 938 connected to the valve stem guide 940. Because the guide supports 938 are located above the upper wall 922, the assembly 900 alternatively could have more or fewer guide supports without affecting the flow rate of the tap dispenser assembly 900. The gap 1302 between the guide supports 938 allows fluid to flow to and from the upper cavity 941 past the guide supports 938 to prevent a vacuum or pressure buildup in the upper cavity 941 based on the movement of the spring button 950 and the resulting change of fluid volume above the guide supports 938 as the user moves the spring button 950 to open and close the tap dispenser assembly 900. The lower wall 924 has a curved shape because the lower wall 924 aligns with the sealing protrusion inner surface 921.

Figure 14A:
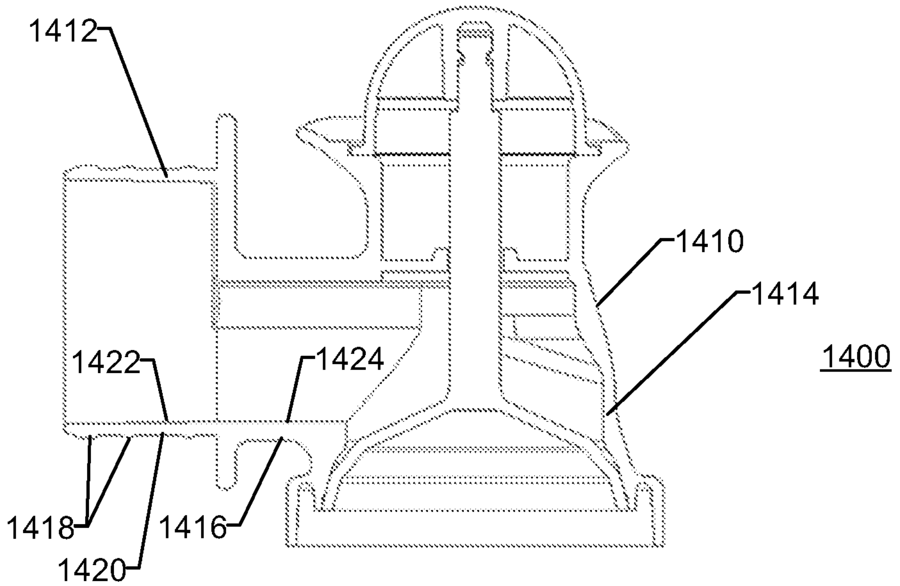
FIG. 14A is a cross section view of a tap dispenser assembly similar to the tap dispenser assembly of FIG. 9 with an alternate attachment portion, in accordance with aspects of this disclosure.
Figure 14B:
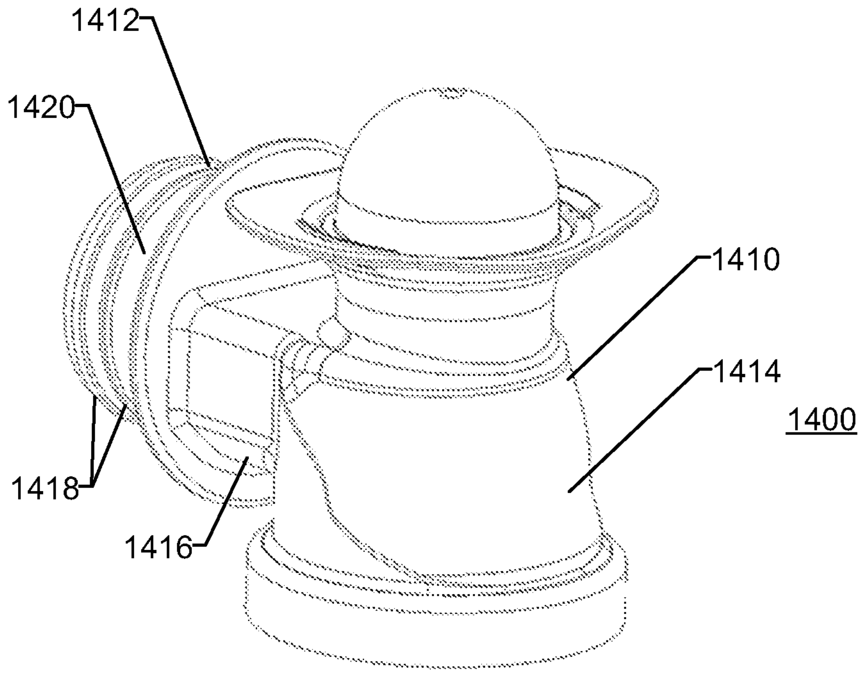
FIG. 14B is a perspective view of tap dispenser assembly of FIG. 14A.

FIG. 14A is a cross section view of a tap dispenser assembly 1400 similar to that of FIG. 9, with an alternate attachment portion 1412, in the closed position. FIG. 14B is a perspective view of the tap dispenser assembly 1400 of FIG. 14A in the closed position.

Similar to the tap dispenser assembly 900 of FIG. 9, the tap dispenser assembly 1400 includes a tap body 1410 with a cylindrical attachment portion 1412, a dispensing portion 1414, and a channel portion 1416. The attachment portion 1412 includes one or more protrusions 1418 on an outer surface 1420 of the attachment portion 1412 and is configured to be inserted in a spout used with a bag-in-box type container or other type of container that uses such a spout. The inner surface 1422 of the attachment portion 1412 aligns with the lower wall 1424 of the channel portion 1416. One would recognize the other similar attachment portions may be used to correspond with alternate designs of spouts of containers to attach the tap dispenser assembly to. In other embodiments, a tap dispenser assembly may attach to the container with a cork style seal press on attachment portion.

Figure 15A:
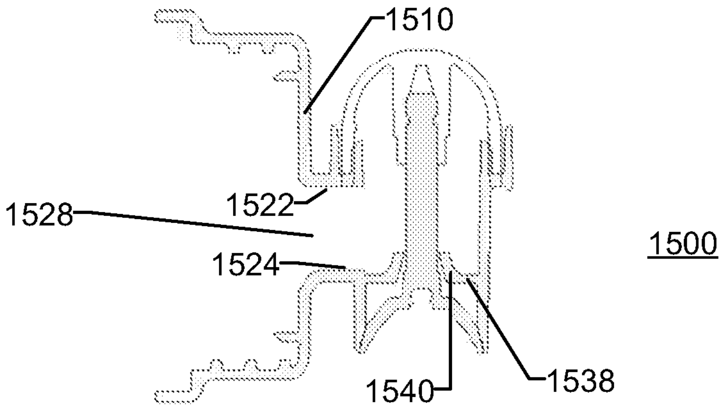
FIG. 15A is a cross section view of an example prior art tap dispenser assembly with a tap body in a closed position.
Figure 15B:
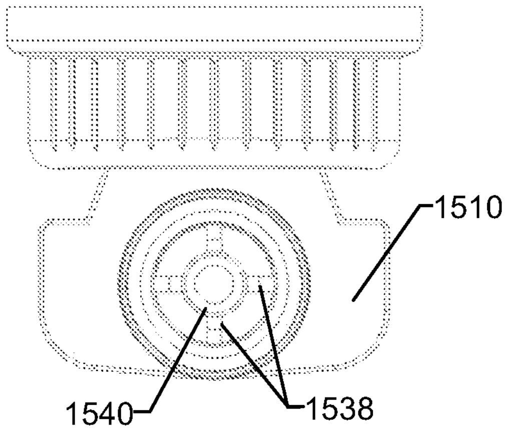
FIG. 15B is a top view of the tap body of FIG. 15A.

FIG. 15A shows a cross section view of an example prior art flexible tap dispenser 1500 having a tap body 1510 in a closed position. FIG. 15B shows a top view of the tap body 1510 of the flexible tap dispenser 1500 of FIG. 15A. The tap body 1510 includes a fluid flow passage 1528 having an upper wall 1522 and a lower wall 1524. The tap body also includes guide supports 1538 that attach to the tap body 1510 below the lower wall 1524 and attach to a valve stem guide 1540. The tap body 1510 of FIG. 15B includes four evenly spaced guide supports 1538.

Figure 16:
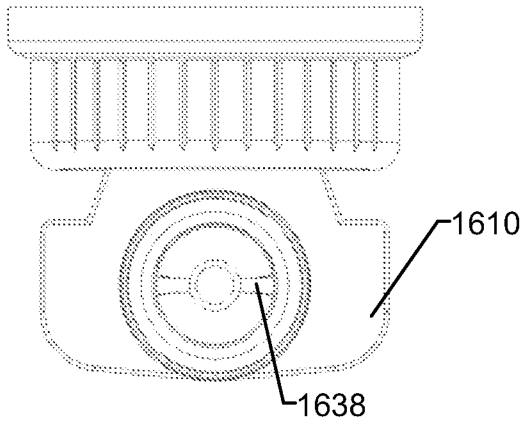
FIG. 16 is a top view of an alternate example prior art tap body similar to the tap body of FIG. 15B.

FIG. 16 shows a top view of another prior art tap body 1610 similar to that of FIG. 15B. The tap body 1610 of FIG. 16 includes two evenly spaced guide supports 1638.

Table 1 below provides experimental test data using the tap dispenser assembly 100 of FIG. 1, the tap dispenser assembly 900 of FIG. 9, the prior art tap dispenser assembly 1500 with four guide supports of FIGS. 15A and 15B, and the prior art tap dispenser assembly using the tap body 1610 of FIG. 16. Various fluids with different viscosities were tested with each tap dispenser assembly, and the corresponding flow rates were measured in ounces per second. As shown below, both the tap dispenser assembly 100 of FIG. 1 and the tap dispenser assembly 900 of FIG. 9 resulted in significant increases of flow rates, particularly with highly viscous fluids.

TABLE 1

Experimental Flow Rate Data

| | | Fluid Tested | | | | |
|---|---|---|---|---|---|---|
| | | Tap Water | Vegetable Oil | Motor Oil | Laundry Detergent | Latex Paint |
| Tap Tested | Prior Art Four Leg | 3.25 | 2.60 | 1.55 | 0.98 | 0.30 |
| | Prior Art Two Leg | 3.75 | 3.05 | 1.98 | 1.25 | 0.35 |
| | Assembly 100 of FIG. 1 | 6.15 | 5.70 | 5.00 | 3.90 | 1.35 |
| | Assembly 900 of FIG. 9 | 12.20 | 9.60 | 7.87 | 6.00 | 2.13 |
| | | AVERAGE OZ/SEC | | | | |

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A tap dispenser for use with a fluid container, the tap dispenser comprising:
  - a tap body comprising an attachment portion, a channel portion, and a dispensing portion;
    - the attachment portion configured to connect to a spout of the fluid container;
    - the channel portion fluidly connecting the attachment portion and the dispensing portion and having an upper wall and a lower wall; and
    - the dispensing portion comprising a valve stem guide connected to at least two guide supports with a gap between the guide supports, wherein the guide supports are located closer to the upper wall than the lower wall;
  - a spring button attached to the dispensing portion; and
  - a valve that is attached to the spring button and slidingly inserted through the valve stem guide; wherein:
  - the tap dispenser having a closed position wherein the spring button is in an nondeflected position which holds the valve in contact with the dispensing portion, preventing fluid flow out of the dispensing portion; and
  - the tap dispenser having an open position wherein the spring button is deflected downward forcing the valve downward such that the valve is not in contact with the dispensing portion, allowing fluid to flow out of the tap dispenser.

2. The tap dispenser of claim 1, wherein the lower wall has a curved shape.

3. The tap dispenser of claim 2, wherein the upper wall is flat.

4. The tap dispenser of claim 2, wherein the channel portion includes side walls that are flat.

5. The tap dispenser of claim 1, wherein the valve includes a stem and a body, the stem having an upper portion and a lower portion, wherein the lower portion has a wider diameter than the upper portion.

6. The tap dispenser of claim 5, wherein the valve body includes a domed portion and a seal surface.

7. The tap dispenser of claim 1, wherein the attachment portion incudes a sealing surface configured to create a seal with the spout.

8. The tap dispenser of claim 1, wherein the dispensing portion further comprises a valve sealing surface and a tapered surface, the tapered surface being directly above the valve sealing surface, and the valve includes a flexible seal surface, wherein the flexible seal surface flexibly engages the valve sealing surface when the tap dispenser is in the closed position.

9. The tap dispenser of claim 1, wherein the attachment portion defines a flow path having a lower wall that is located below the lower wall of the channel portion.

10. The tap dispenser of claim 1, wherein the dispensing portion further comprises finger supports.

11. A tap dispenser for use with a fluid container, the tap dispenser comprising:

a tap body comprising an attachment portion, a channel portion, and a dispensing portion;

the attachment portion configured to connect to a spout of the fluid container;

the channel portion fluidly connecting the attachment portion and the dispensing portion and having a lower wall; and the dispensing portion comprising a valve stem guide being located above the lower wall and being connected to a guide support located on an inner wall of the dispending portion that is radially opposite the channel portion, wherein the guide support extends above the valve stem guide;

a spring button attached to the dispensing portion; and a valve attached to the spring button and slidingly inserted through the valve stem guide;

wherein:

the tap dispenser having a closed position wherein the spring button is in a nondeflected position which holds the valve in sealing contact with the dispensing portion, preventing fluid flow out of the dispensing portion; and the tap dispenser having an open position wherein the spring button is deflected downward, forcing the valve downward such that the valve is not in contact with the dispensing portion, allowing fluid to flow out of the tap dispenser.

12. The tap dispenser of claim 11, wherein the guide support extends downwardly at an angle from the inner wall.

13. The tap dispenser of claim 11, wherein the guide support extends from a point above a top wall of the channel portion to the valve stem guide.

14. The tap dispenser of claim 11, wherein the dispenser portion further comprises a valve sealing surface and a protective shroud, the protective shroud being spaced radially outward from the dispensing portion valve sealing surface.

15. The tap dispenser of claim 14, wherein the protective shroud extends below the dispensing portion valve sealing surface.

16. The tap dispenser of claim 14, wherein the valve further comprises a valve stem that is received in the valve stem guide, a sealing portion that engages the valve sealing surface when the tap dispenser is in the closed position, and a flat portion that connects the sealing portion with the valve stem.

17. The tap dispenser of claim 11, wherein the attachment portion is threadably connected to the spout of the fluid container and incudes a sealing surface configured to create a seal with the spout.

18. The tap dispenser of claim 11, wherein the lower wall has a curved shape and the channel portion includes an upper wall that is flat.

19. The tap dispenser of claim 18, wherein the channel portion includes side walls that are flat.

20. The tap dispenser of claim 11, wherein the attachment portion defines a flow path having a lower wall that is located below the lower wall of the channel portion.

* * * * *